United States Patent [19]

Takahashi et al.

[11] Patent Number: 4,594,497
[45] Date of Patent: Jun. 10, 1986

[54] IMAGE PROCESSING WELDING CONTROL METHOD

[75] Inventors: Youichi Takahashi; Koji Kashiwakura, both of Hitachi; Junichiro Morisawa, Ibaraki; Masahiro Kobayashi, Hitachi, all of Japan

[73] Assignee: Hitachi, Ltd., Tokyo, Japan

[21] Appl. No.: 736,691

[22] Filed: May 22, 1985

[30] Foreign Application Priority Data

May 23, 1984 [JP] Japan .................. 59-102588

[51] Int. Cl.$^4$ .............................. B23K 9/10
[52] U.S. Cl. .................. 219/130.21; 219/124.34; 318/577
[58] Field of Search ............. 219/124.34, 130.21, 219/130.01; 318/577; 364/477

[56] References Cited

U.S. PATENT DOCUMENTS

| 3,370,151 | 2/1968 | Normando | 219/130.21 |
| 4,477,712 | 10/1984 | Lillquist et al. | 219/124.34 |
| 4,532,404 | 7/1985 | Boillot et al. | 219/130.21 |

FOREIGN PATENT DOCUMENTS 56-102375 8/1981 Japan .
57-28679 2/1982 Japan .
58-38669 3/1983 Japan .

OTHER PUBLICATIONS

R. D. Richardson et al., "The Measurement of Two-Dimensional Arc Weld Pool Geometry by Image Analysis", in *Measurement and Control for Batch Manufacturing*, ASME, pp. 137-148, 1982.

*Primary Examiner*—Clifford C. Shaw
*Attorney, Agent, or Firm*—Antonelli, Terry & Wands

[57] ABSTRACT

An image processing welding control method comprises detection of isothermal pattern of a weld zone in the welding state through photographing the weld zone by an infrared camera; calculation of the area of the region defined by the isothermal line detected; comparison of the area with a standard area which is obtained in advance; control of welding heat input such that the area will be substantially the same as the standard area whereby a suitable welding heat is input the welding portion; detection of an asymmetric extent of said isothermal pattern; and controlling the torch position such that the asymmetric extent will be within a predetermined value, so that the torch will be strictly aligned with the welding groove center. This method enables two kinds of welding control methods, torch position control and welding heat input control, based on the same image information.

6 Claims, 8 Drawing Figures

IMAGE PROCESSING WELDING CONTROL METHOD

BACKGROUND OF THE INVENTION

This invention relates to a welding control method using image processing, and more particularly to a welding control method suitable for welding a thick plate with a narrow groove.

A welding control method consists of a welding torch position control method for conducting the welding with the torch being strictly in alignment with the welding groove and a welding heat input control method for controlling the depth of the weld. The former includes contact type welding torch position control which employs a roller simulating a welding groove, and a method of controlling the relative position of a torch to a welding groove by photographing an arc, detecting illumination intensity of the photographed images at two points in the width direction of the welding groove, and controlling the position of the torch to align with the groove center, which is disclosed in Japanese Patent Laid-open Application No. 38669/1983.

The letter control method includes a method in which welding conditions are set in advance and welding is conducted while reproducing these conditions for control, and a welding controlling method in which welding heat input is controlled based on the detected temperature of the molten metal, which is described in Japanese Patent Laid-open Application Nos. 102375/1981, and 28679/1982.

However, all of these methods are only capable of conducting either positioning control or heat input control and there is no method for controlling both position and heat input simultaneously.

Demand for progress in work efficiency in the field of welding by reduction of labor and automation has recently increased; hence, narrow groove welding has been developed. In the case of narrow groove welding, if the weld penetration into material to be welded at the groove face is small, multilayer welding is liable to produce defects, and this creates need to provide welding control of high accuracy.

SUMMARY OF THE INVENTION

An object of the present invention is to provide a highly reliable welding controlling method which is capable of simultaneous control of both torch position and welding heat input by detecting the temperature of a weld zone and which is also capable of real time control in the welding state.

Another object of the invention is to provide a welding controlling method which is capable of both torch position control and welding heat input control by photographing a temperature state of a weld zone, whereby said two kinds of control are effected based on the same information.

A welding controlling method based on image processing according to the invention is characterized in that an isothermal pattern of a weld zone in the welding state is detected; an asymmetric extent of the isothermal pattern with respect to a welding direction or a welding groove direction is detected; judgement is made as to whether the asymmetric extent is within a predetermined one; the position of a welding torch is controlled according to the judgement such that the asymmetric extent will be within the predetermined one; the area of a preset isothermal pattern of a temperature and that of the really detected isothermal pattern of the same temperature as above are compared; and welding heat input is controlled such that these areas are substantially the same.

According to an aspect of the present invention, the asymmetric extent of the isothermal pattern is detected as a displacement or distance between the centroids of isothermal lines of the isothermal pattern in a direction perpendicular to the welding direction, and the torch position is controlled such that the displacement will be substantially zero.

According to another aspect of the invention, the asymmetric extent of the isothermal pattern is detected as an area of part or parts of the pattern which are not overlapped when the pattern is bent or folded at a dividing line passing the centroid of the pattern in parallel with the welding groove, or is turned over 180° about the line, and the torch position is controlled such that the area will be within a predetermined value.

DESCRIPTION OF THE PREFERRED EMBODIMENTS

Figure 1:
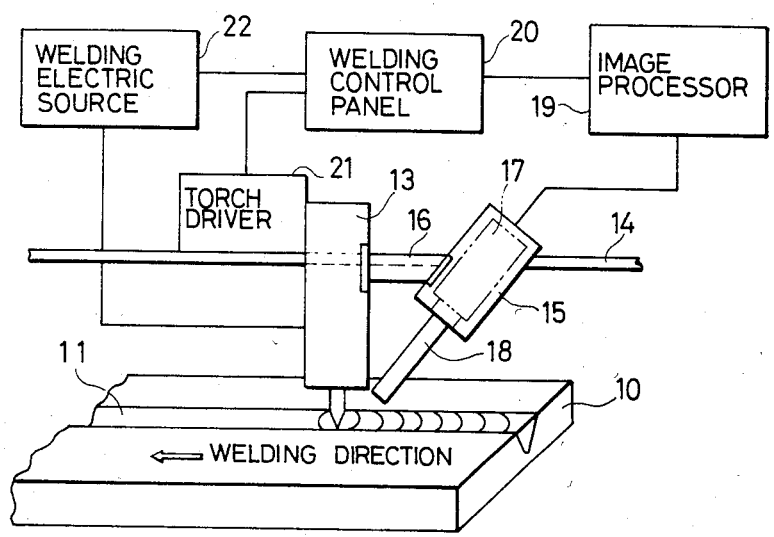
FIG. 1 is a schematic view of a welding control system according to the present invention.

An embodiment of the present invention is described hereunder referring to the drawings.

In FIG. 1 showing a schematic diagram showing a welding control system, materials 10 to be welded have welding grooves 11 formed therein along a welding direction. A welding torch 13 is disposed to run on a rail 14. The torch 13 is provided with an electrode of tungsten which is positioned in the welding groove 11. A photographing device 15 is fixed to the torch 13 by an arm 16, and has an infrared camera 17 and a fiberscope 18. The fiber scope 18 is directed to welding pool and around the pool so as to photograph there. The photographing device 15 is connected to an image processing device or image processor 19 to transfer thereto photographed image information and process the image information to produce there control signals which are transferred to a welding control panel 20. The welding control panel 20 controls electric power for driving a torch driver 21 according to the signals from the image processing device 19, and electric power supplied from a welding electric source 22 to the welding torch 13 according to the welding conditions. The torch driver 21 is connected to the welding torch 13 and is provided means for driving the torch 13 perpendicularly to the welding direction, so that the electrode can run along a center line of the welding groove 11.

Figure 2A:
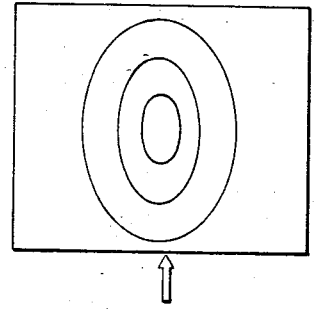
FIGS. 2a and 2b are explanatory views of torch position control.
Figure 2B:
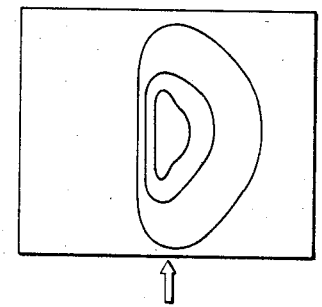
Figure 3A:
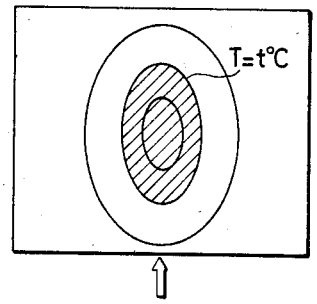
FIGS. 3a and 3b are explanatory views of welding heat input control.
Figure 3B:
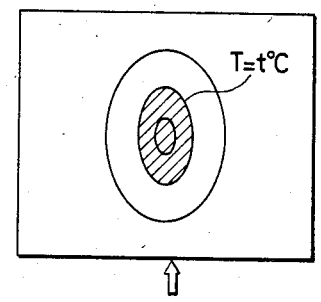

An embodiment of the welding controlling method according to the invention will be explained with reference to FIGS. 2a to 3b, in which arrows show a welding groove direction. FIGS. 2a and 2b are explanatory views of torch position control. When the welding torch is in the appropriate position, for example, on the center line of the welding groove, the isothermal lines display a preset standard pattern as shown in FIG. 2a, but when the welding torch deviates from the correct position, for example, the above-mentioned center line, either to the right or the left, the isothermal lines are deformed and displacement of the centroid of each line is shown, as in the pattern shown in FIG. 2b. By detecting this displacement or the distance between the centroids of the lines, therefore, the position of the torch is controlled and restored to the correct position. FIGS. 3a and 3b are explanatory views of welding power input control. It is also possible to control welding heat input using the isothermal pattern for torch position control. FIG. 3a is a preset standard isothermal pattern. The optimum temperature range for welding heat input control is determined in advance depending upon the material, plate thickness and the like, of a welding material, and a region defined by an isothermal line in the temperature range is indicated by the hatched area. When welding heat input is reduced, the region becomes smaller, as is shown in FIG. 3b. Therefore, heat input control is conducted by comparing the area of the hatched region in the standard pattern with that of the hatched region in FIG. 3b. In this way, control of both torch position and welding heat input is possible by utilizing the isothermal patterns.

Figure 4:
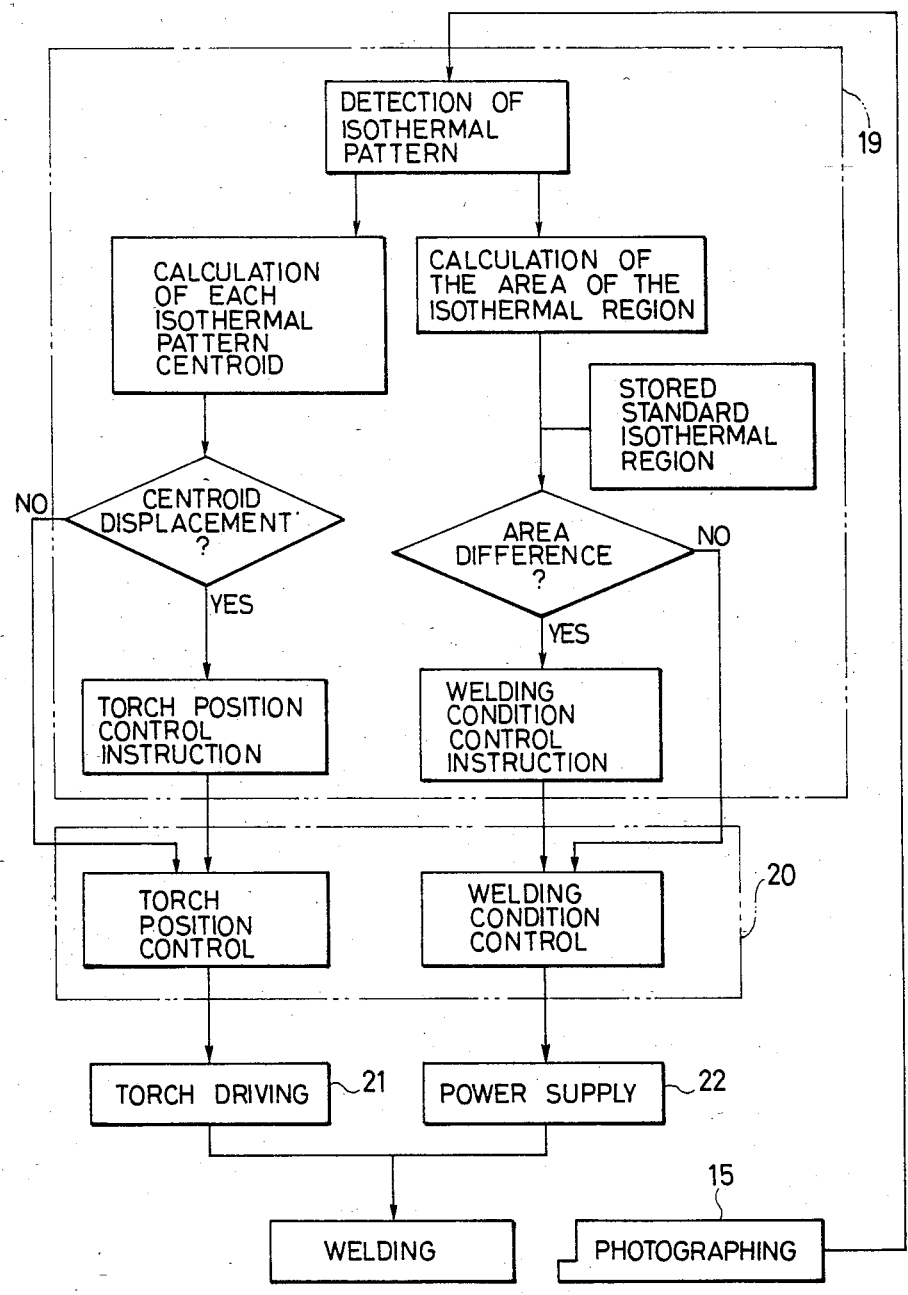
FIG. 4 is a flow chart explaining an embodiment of welding control according to the present invention.

Referring to FIG. 4 which is a flow chart of the welding controlling method, the controlling method will be further described hereunder in detail.

The materials 10 to be welded are formed of welding grooves 11. The materials 10 are abutted to each other at their grooves 11 to fron a narrow V-shape. The welding torch 13 is positioned so that the electrode is disposed strictly in the groove 11. Welding power is supplied to the torch 13 to start welding.

A weld zone in the welding state is photographed by the photographing device 15, whereby the distribution of temperature within the weld zone is detected. Information relating to the image is transferred to the image processing device 19. In the image processing device 19, the temperature distribution is indicated by isothermal lines, namely, the isothermal pattern is detected. An area S of the region defined by the isothermal line showing a temperature (t° c.) of the weld zone is calculated. The area S is compared with the area So of the standard isothermal pattern, prepared in advance based on the initial conditions which will influence the isothermal pattern such as material, thickness and the shape of the groove of the welding material, and corresponding to an appropriate welding condition, to make a difference $\Delta S$ therebetween. If the difference $|\Delta S|$ is substantially zero or less than a predetermined value So under which the appropriate welding condition can be kept, the image processing device 19 does not produce any instructions to the welding control panel 20 so that the welding condition as it is will be kept further. When the difference $|\Delta S|$ is larger than the predetermined value So or substantially zero, then an instruction to control the welding condition such as electric currents is made here and is transferred to the welding control panel 20. The welding control panel 20 controls electric current supplied from the welding electric source 22 to the torch 13 so that the welding power input is adjusted to keep appropriate welding depth.

The image processing device 19 further calculates the centroid of each isothermal line detected. It is enough to have two isothermal lines of different temperatures and find the centroids. The centroids or the center position of the isothermal lines are compared with each other to find displacement therebetween in a perpendicular direction to the groove direction. When there is a displacement, the image processing device 19 produces instructions for the torch position control and transfers them to the welding control panel 20. The panel 20 transfers controlled electric power to the torch driver to electrically drive it, so that the torch 13 is shifted left or right with respect to the central line of the welding groove 11 to restore an appropriate torch position.

The control result is monitored by the photographing device 17 and the resultant information is transferred to the image processing device 19 as previously stated, which is repeatedly effected.

According to this embodiment, at least two isothermal lines are detected, the difference of the centroid or center position of the each isothermal line resultant from the deformation of the each isothermal line is detected, and the torch is controlled such that the difference reaches the predetermined value such as substantially zero. At least one of the isothermal lines also is used for controlling the power input. Thus, single information source is used for different two kinds of welding control, the torch positioning control and control of weld depth due to power input, what's more, the two kinds of control are effected simultaneously, so that the welding is controlled accurately because the weld depth and the relative position of the torch to the groove sides influence greatly the welding effect.

If the material to be welded moves and is welded by a fixed welding torch, the photographing device need not be attached to the torch and may be fixed to a position where it is possible to monitor the weld zone. In this case, the position of the material to be welded is controlled in relation to the welding torch in the course of the welding operation so as to hold to the standard isothermal pattern. In this way, according to this invention, either a welding torch or a material to be welded can be controlled.

Further the structure of the photographing device varies with the thickness, the shape of the groove and other factors in the material to be welded. When the plate is relatively thin, it is possible to directly monitor the weld zone with the infrared camera. Further, it is possible to take out the image of the weld zone with an optical lens system rather than the fiberscope, and transfer it to the infrared camera.

Figure 5:
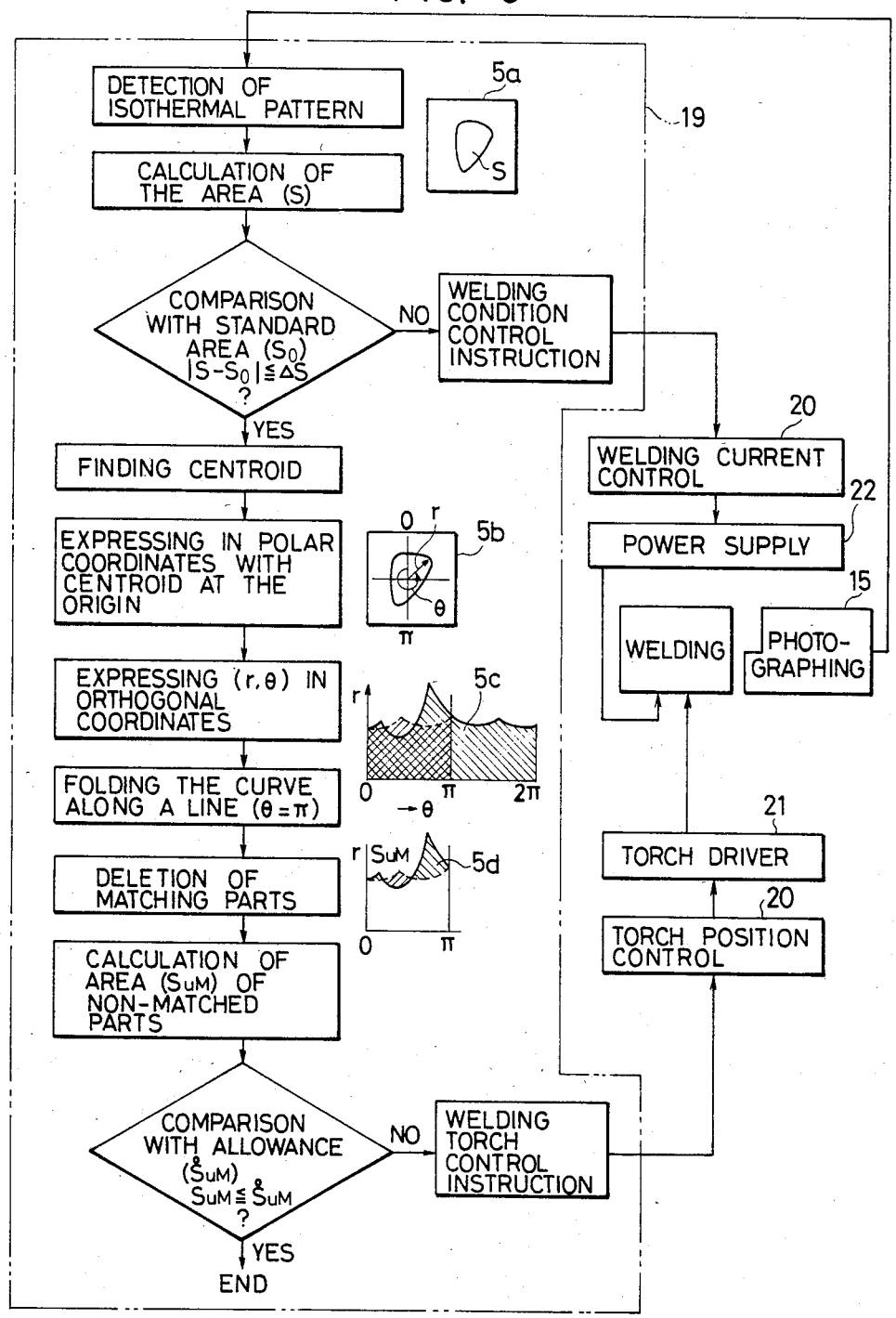
FIG. 5 is a flow chart explaining another embodiment of welding control according to the present invention.

Another embodiment of the present invention is described hereunder referring to FIG. 5.

Image information obtained through photographing of the weld state of the material 10 by the photographing device 15 is transferred to an image processor 19. In the image processor 19, an isothermal pattern as shown by 5a is detected through binarization of the image information. The area S of the region defined by the isothermal line of the isothermal pattern is calculated. The area S is compared with a standard area So which is calculated in advance and which is one of a standard isothermal pattern obtained through photographing an optimum welding condition under which the material is welded well enough. If the resultant difference $|S-So|$ is more than a predetermined value $\Delta S$ an instruction for control or correction of welding conditions such as current for welding is given to the welding control panel 20 in which electric current from the power source 22 to the welding torch is controlled. If the difference |S−So| is not more than the predetermined value ΔS, any instruction is not given to the welding panel.

Asymmetric extent is found as follows: First of all, the centroid of the isothermal pattern or the region S defined by the isothermal line is found. The isothermal pattern S is expressed in (r. θ) polar coordinates with the centroid at the origin, as shown by 5b. In the polar coordinates. An o−π direction corresponds to the direction of the welding groove 11 of the material, and r is distance between the centroid and the isothermal line of the pattern. A relationship of r and θ is expressed in orthogonal coordinates as shown by 5c. The curve expressing the relation (θ. r) is folded at a line passing π. Matched or overlapped parts by the folding are deleted to leave non-matched parts (Sum) as shown in FIG. 5d. The area of the parts (Sum) is calculated, and the area is asymmetric extent according to the present invention. The area (Sum) is compared with a predetermined area or value (Sum) which is an allowable amount within which any instruction is not given to the welding control panel 20. If the area Sum is more than the predetermined value (Sum), an instruction for control of the welding torch 13 is given to the welding control panel 20 in which electric signals for control of the torch position are generated. And the torch is driven according to the signals from the welding control panel 20 so that the torch 13 is positioned at an optimum position in the welding groove.

The resultant welding state is monitored by photographing it as previously stated.

Figure 6:
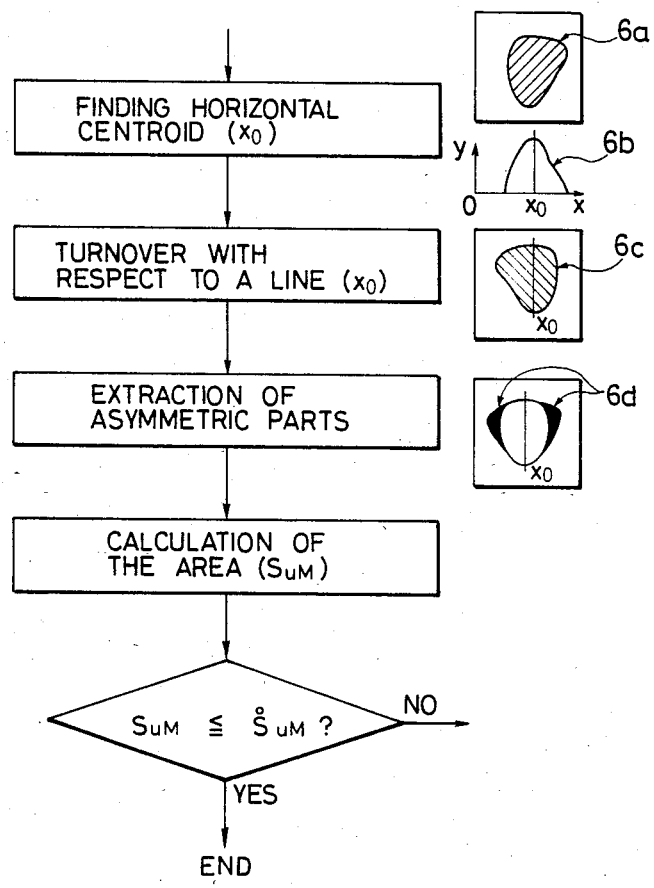
FIG. 6 is a flow chart explaining another method of finding an asymmetric extent which is used for controlling the torch position in FIG. 5.

Another example of finding the asymmetric extent of the isothermal pattern is described hereunder referring to FIG. 6.

In FIG. 6, an isothermal pattern 6a is obtained through binarization of image information from the infrared camera 17 as in FIG. 5. The pattern 6a is shifted, in parallele with the Y-ordinate, on X-Y orthogonal coordinates and the area defined by a curve 6b and the X-absussa is divided by a line, which is passing a point Xo in parallel with the Y-ordinate (and which is called line xo is called a horizontal centroid in this description). The pattern is turned over about the line Xo to overlap the original pattern position. Non-overlapped parts 6d or asymmetric parts are extracted, by deletion of the overlapped parts and the area (Sum) of the parts are calculated. The area (Sum) expresses the asymmetric extent of the isothermal pattern 6a.

If the pattern is circular, the area is zero and the pattern is symmetric with respect to the line Xo.

Thus, the asymmetric extent is found. The torch position relative to the welding groove is controlled using this asymmetric information in the same manner as according to FIG. 5.

A welding controlling method according to the invention is broadly applicable to a welding method in which a weld zone is melted by a load of external energy. As to a heat input controlling method, the focal position of an electron beam, welding current or welding voltage in an electron beam, and the flow rate of gas or welding speed in gas welding are controllable by detection of isothermal line patterns in the same way as arc welding.

According to this invention, simultaneous control of both the position of a torch and welding heat input is possible by detecting distribution of temperature, and welding control with high reliability can be realized by utilizing a welding state as information for control.

In addition, this invention greatly contributes to the achievement of progress in the field of welding. Namely, this invention enables completely automatic control, and realizes real time control which is necessary for the wide application of robots to the field of welding.

What is claimed is:

1. A welding controlling method using image processing comprising the steps of:
    detecting a isothermal pattern having at least two isothermal lines, different in temperature, of a weld zone in the welding state;
    detecting the existence of displacement of the centroid of said each isothermal line in a perpendicular direction to a welding direction;
    controlling a relative position of a welding torch to a material to be welded such that said displacement is substantially zero is there is displacement, thereby to restore an optimum relative position of said torch to the material;
    calculating the area of the region defined by one of said detected isothermal lines;
    comparing said area with a preset reference area; and
    controlling welding heat input such that these areas are substantially the same.

2. The welding controlling method as defined in claim 1, wherein the step of detecting the isothermal pattern includes photographing the weld zone by an infrared camera.

3. The welding controlling method as defined in claim 1, wherein in said step of controlling a relative position of said torch, said torch is shifted perpendicularly to a welding direction, and in said step of welding heat input control, welding current is controlled.

4. A welding controlling method using image processing, comprising the steps of:
    welding material to be welded with a groove while making a relative movement of a torch to the material along the groove;
    photographing a weld zone by an infrared camera to produce image information;
    detecting an isothermal pattern from said image information;
    calculating the area of said isothermal pattern;
    comparing said area with a preset reference area to make a control signal corresponding to the difference of these areas;
    controlling welding heat input according to said control signal so that a suitable welding heat is input the weld zone;
    detecting an asymmentric extent of said isothermal pattern with respect to the groove direction;
    comparing the asymmentric extent of said isothermal pattern with a predetermined value; and
    controlling the relative position of the welding torch to the material such that said asymmetric extent will be less than a predetermined value.

5. The welding controlling method as defined in claim 4, wherein in said asymmetric extent detecting step, the asymmetric extent is detected as a magnitude relating to an area of asymmetric part of said isothermal pattern.

6. The welding controlling method as defined in claim 4, wherein said predetermined value is substantially zero.

* * * * *